United States Patent [19]

Sekimoto et al.

[11] Patent Number: 4,678,276
[45] Date of Patent: Jul. 7, 1987

[54] OBJECTIVE LENS DRIVE/SUPPORT MECHANISM IN AN OPTICAL DISC PLAYER

[75] Inventors: Yoshihiro Sekimoto; Shigeo Terashima, both of Tenri; Kiyoshi Kumata, Tsuzuki; Toshiyuki Tanaka, Kadoma, all of Japan

[73] Assignee: Sharp Kabushiki Kaisha, Osaka, Japan

[21] Appl. No.: 681,818

[22] Filed: Dec. 14, 1984

[30] Foreign Application Priority Data

Dec. 26, 1983 [JP] Japan ................................. 58-250747

[51] Int. Cl.$^4$ .......................... G02B 7/02; F16F 7/12; F16F 15/04
[52] U.S. Cl. ..................................... 350/247; 74/574; 188/378; 350/255
[58] Field of Search .............................. 350/247, 255; 369/44–45; 188/378–379; 74/574

[56] References Cited

U.S. PATENT DOCUMENTS

| | | | |
|---|---|---|---|
| 4,472,024 | 9/1984 | Konomura et al. | 350/255 |
| 4,473,274 | 9/1984 | Yano et al. | 350/255 |
| 4,482,986 | 11/1984 | Noda et al. | 350/255 |
| 4,516,955 | 5/1985 | Wörner et al. | 188/379 |

FOREIGN PATENT DOCUMENTS

| | | | |
|---|---|---|---|
| 1374234 | 8/1964 | France | 74/574 |
| 57-210457 | 12/1982 | Japan | |
| 485140 | 5/1938 | United Kingdom | 74/574 |

*Primary Examiner*—William H. Punter
*Attorney, Agent, or Firm*—Birch, Stewart, Kolasch & Birch

[57] ABSTRACT

An objective lens drive/support mechanism in an optical disc player system includes an objective lens support member which is slidably and rotatably secured to a main shaft of the mechanism. An objective lens is supported by the objective lens support member at a position which is separated from the main shaft by a predetermined distance. The objective lens support member is driven to slide along the main shaft to perform the focus control, and the objective lens support member is rotated around the main shaft to perform the tracking operation. A symmetrically "8" shaped elastic damping member is tightly secured to the main shaft at the center of the symmetrically "8" shaped elastic damping member. Both ends of the symmetrically "8" shaped elastic damping member are fixed to the objective lens support member, whereby the single symmetrically "8" shaped elastic damping member conducts the damping operation in both the focal direction and the tracking direction.

5 Claims, 10 Drawing Figures

OBJECTIVE LENS DRIVE/SUPPORT MECHANISM IN AN OPTICAL DISC PLAYER

BACKGROUND OF THE INVENTION

1. Field of the Invention The present invention relates to an objective lens drive/ support device in, for example, an optical disc player system.

2. Description of the Prior Art In an optical disc player system such as a compact disc player or a video disc player, a laser beam is applied from a semiconductor laser to a recording disc via an objective lens for reproduction purposes. The laser beam must be focused on a chain of pits formed on the recording disc, and the beam spot must be accurately positioned on the chain of pits in order to ensure a stable reproduction operation. That is, the objective lens should be driven in two-dimensional directions to conduct the focusing control and the tracking control.

In such an objective lens drive/support mechanism, a damping member is required to ensure a smooth movement of the objective lens. If a single damping member performs the damping operation in the two-dimensional directions, a reproduction head will become compact in size.

In the conventional system which has a damping member performing the two-dimensional damping operation, undesirable movement is produced because the damping member is secured to an objective lens support mechanism at one side thereof.

OBJECTS AND SUMMARY OF THE INVENTION

Objects of the Invention

Accordingly, an object of the present invention is to provide a compact size objective lens drive/support mechanism for an optical disc player.

Another object of the present invention is to provide a novel damping device in an objective lens drive/support mechanism, which ensures a stable operation of an optical disc player.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, pursuant to an embodiment of the present invention, an objective lens support member is driven in the shaft direction to perform the focus adjustment, and is rotated around the shaft to perform the tracking control. An objective lens is supported by the objective lens support member at a position which is separated from the shaft of the objective lens support member. A symmetrical damping member is secured around the shaft, which performs the damping operation in the shaft direction and in the plane perpendicular to the shaft. Opposing ends of the symmetrical damping member perform the circular movement around the shaft so that no torsion is created in the focal direction when torsion is created in the tracking direction to perform the damping operation in the tracking direction.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
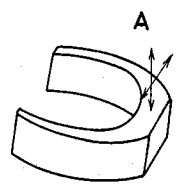
FIG. 1 is a perspective view of a damping member employed in the objective lens drive/support mechanism of the prior art.

FIG. 1 shows an example of the conventional damping member employed in an objective lens drive/support mechanism in an optical disc player system of the prior art. The damping member of FIG. 1 is disclosed in, for example, Japanese Patent Laid Open (Kokai) No. 57-210457, "OBJECTIVE LENS DEVICE", published on Dec. 24, 1982.

The conventional damping member is U-shaped, and the tip ends thereof are tightly secured to the lens support mechanism. If the objective lens is driven in the focal direction shown by an arrow A, undesirable movement is created because of the one side support of the damping member.

Figure 2:
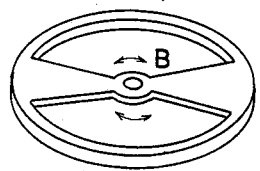
FIG. 2 is a perspective view of a prototype damping member related to an objective lens drive/support mechanism of the present invention.
Figure 3:
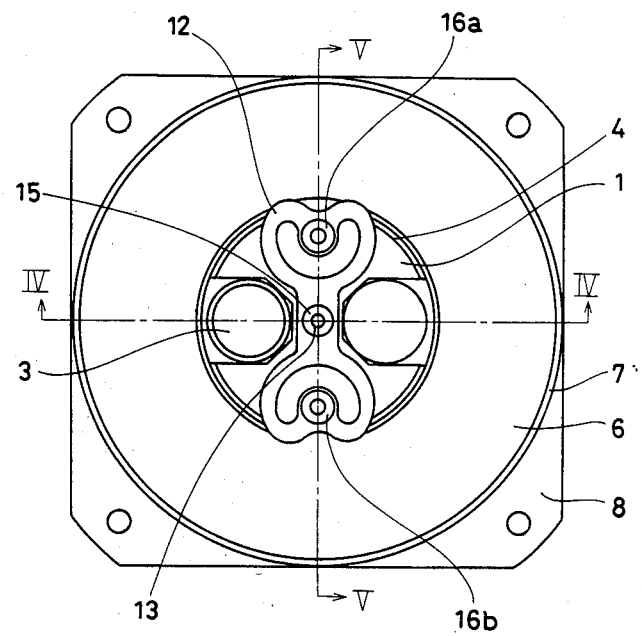
FIG. 3 is a plan view of an embodiment of an objective lens drive/support mechanism of the present invention.
Figure 4:
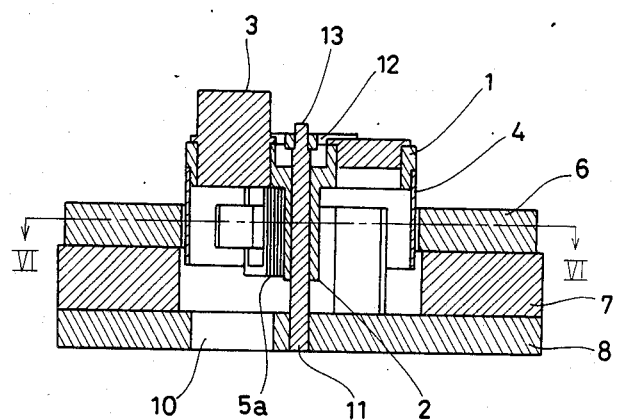
FIG. 4 is a sectional view taken along line IV—IV of FIG. 3.
Figure 5:
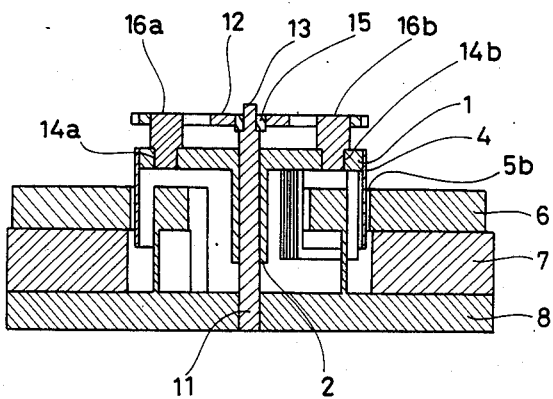
FIG. 5 is a sectional view taken along line V—V of FIG. 3.
Figure 6:
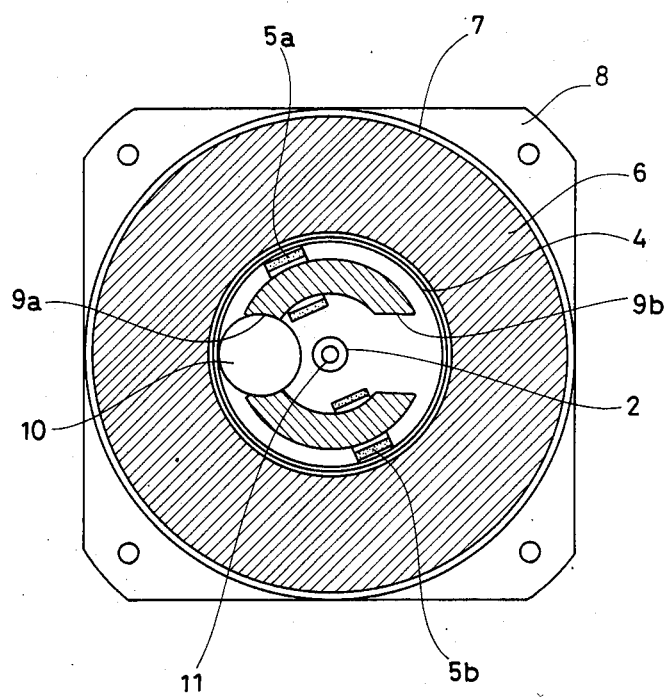
FIG. 6 is a sectional view taken along line VI—VI of FIG. 4.

To prevent the generation of undesirable movement, the present inventors have developed a symmetrical damping member. The prototype of the symmetrical damping member of the present invention is shown in FIG. 2. The periphery of the symmetrical damping member of FIG. 2 is fixed, and the center of the symmetrical damping member of FIG. 2 is secured to a movable shaft. The damping in the focal direction is achieved by the shift movement in the shaft direction, and the damping in the tracking direction is achieved by the torsion of the symmetrical damping member in the direction shown by an arrow B. The symmetrical damping member of FIG. 2 is effective to minimize undesirable movement. However, there is the possibility that undesired torsion is created in the focal direction when the symmetrical damping member forms torsion in the tracking direction.

FIGS. 3 through 7 show an embodiment of an objective lens drive/support mechanism of the present invention. An objective lens support member 1 includes a bearing portion 2 at the center thereof. The surface of the bearing portion 2 is smoothed by the specular treatment to ensure a smooth slide. A lens holding opening 1a is formed in the objective lens support member 1 at a position which is separated from the shaft center by a predetermined distance. An objective lens 3 is inserted into the lens holding opening 1a, and is held in the lens holding opening 1a. A focus control coil 4 is wound around the periphery of the objective lens support member 1. Two tracking control rectangular coils 5a and 5b are disposed within the circular focus control coil 4 in a manner that the two tracking control rectangular coils 5a and 5b confront each other at positions where they do not disturb the laser beam passing through the objective lens 3.

Figure 7:
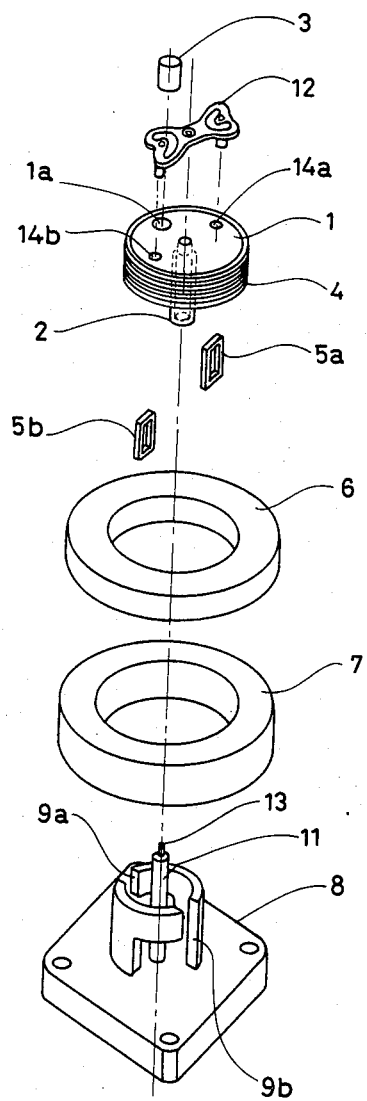
FIG. 7 is an exploded perspective view of the objective lens drive/support mechanism of FIG. 3.

A magnetic circuit includes a yoke plate 6, a magnet 7, and a yoke 8 (including a bottom base and a cylinder portion). The cylinder portion of the yoke 8 has L-shaped cut-away portions 9a and 9b as shown in FIG. 7. An opening 10 is formed in the bottom base of the yoke 8 at the position corresponding to the cut-away portion 9a so as to form a beam path. A shaft 11 is secured to the bottom base of the yoke 8 at the center of the bottom base. A low-friction coating is provided on the surface of the shaft 11 to ensure a smooth movement of the objective lens support member 1 along the shaft 11. A step portion 13 is formed at the tip end of the shaft 11 to engage an elastic damping member 12.

The objective lens drive/support mechanism of the present invention is fabricated in the following manner. The shaft 11 is inserted into the bearing portion 2 of the objective lens support member 1 in such a manner that the top free portion of the L-shaped cut-away portions 9a and 9b of the yoke 8 are positioned at the tracking control rectangular coils 5a and 5b. Then, the objective lens support member 1 is slightly rotated around the shaft 11 to a predetermined position at which the objective lens 3 supported by the objective lens support member 1 confronts the opening 10 formed in the bottom base of the yoke 8. Under these conditions, the step portion 13 of the shaft 11 protrudes above the objective lens support member 1. The center portion of the elastic damping member 12 engages the step portion 13 of the shaft 11, and the both ends of the elastic damping member 12 engage with holes 14a and 14b formed in the objective lens support member 1, thereby securing the elastic damping member 12 to the shaft 11 and the objective lens support member 1.

The bearing portion 2 of the objective lens support member 1 is slidable along the shaft 11 to perform a focusing control.

Further, the bearing portion 2 of the objective lens support member 1 is rotatable around the shaft 11 to perform a tracking control.

Figure 8:
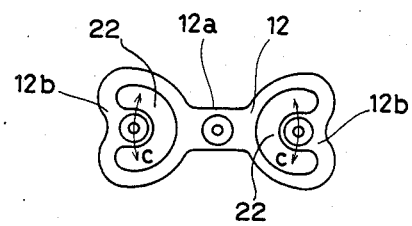
FIG. 8 is a plan view of a damping member employed in the objective lens drive/support mechanism of FIG. 3.

The elastic damping member 12 is preferably made of rubber, and is approximately "8" shaped as shown in FIG. 8. As already discussed, the center portion of the elastic damping member 12 is secured to the shaft 11, and the both ends of the elastic damping member 12 are secured to the objective lens support member 1. The supporting condition is symmetrical about the center of the elastic damping member 12. Accordingly, undesirable movement is not created when the tracking control is conducted. Further, the torsion in the focal direction, which is caused by the torsion in the tracking direction, is minimized because both ends of the elastic damping member 12 performs the circular movement in the tracking control.

The center portion 12a of the elastic damping member 12 is positioned at the center of the objecive lens drive/support mechanism. The elastic damping member 12 includes symmetrical crotch portions 22 and end collapses 12b at the both ends of the crotch portions 22. The damping operation in the tracking direction is achieved by the circular movement of the symmetrical crotch portions 22 as shown by arrows C in FIG. 8.

In a preferred form, a metal coupler 15 is secured to the center portion 12a of the elastic damping member 12 so as to ensure tight connection between the elastic damping member 12 and the step portion 13 of the shaft 11. Metal legs 16a and 16b are secured to the end collapses 12b of the elastic damping member 12 to ensure tight connection between the elastic damping member 12 and the objective lens support member 1 with the holes 14a and 14b.

Figures 9, 10:
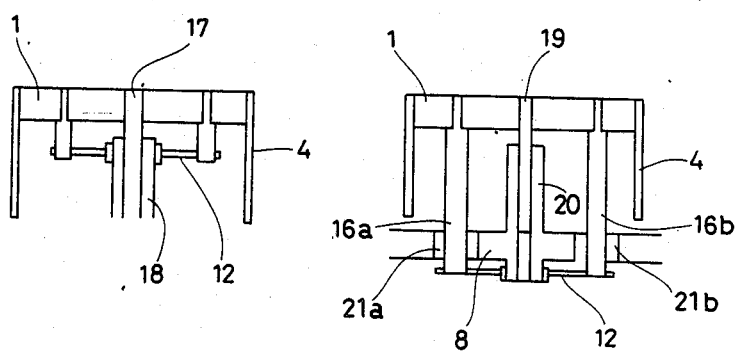
FIG. 9 is a schematic sectional view showing an essential part of another embodiment of an objective lens drive/support mechanism of the present invention.
FIG. 10 is a schematic sectional view showing an essential part of still another embodiment of an objective lens drive/support mechanism of the present invention.

In the foregoing embodiment, the shaft is held stationary, and the bearing portion is slidable and rotatable about the shaft. FIGS. 9 and 10 show other embodiments, wherein the bearing portion is held stationary, and the shaft is slidable and rotatable in the bearing portion. In accordance with the present invention, the center portion 12a of the elastic damping member 12 must be tightly secured to the stationary portion. Therefore, in the embodiment of FIG. 9, a shaft 17 is secured to the objective lens support member 1, and a bearing rod 18 is secured to the bottom base of the yoke 8. The elastic damping member 12 is disposed under the objective lens support member 1 within the circular focus control coil 4. The center portion of the elastic damping member 12 is secured to the bearing rod 18, and the end portions of the elastic damping member 12 are secured to the objective lens support member 1. In this embodiment, the fabrication becomes complicated because the elastic damping member is disposed within the circular focus control coil 4. In the embodiment of FIG. 10, a shaft 19 is secured to the objective lens support member 1, and a bearing rod 20 is secured to the bottom base of the yoke 8. Apertures 21a and 21b are formed in the bottom base of the yoke 8 through which the metal legs 16a and 16b are disposed. The elastic damping member 12 is disposed below the bottom base of the yoke 8. The long distance connection between the objective lens support member 1 and the elastic damping member 12 will adversely affect on the system response. Thus, the embodiment of FIGS. 3 through 7 is most preferable to embody the present invention.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An objective lens drive/support mechanism comprising:
   shaft means;
   an objective lens support member slidably and rotatably secured to said shaft means;
   an objective lens disposed in said objective lens support member at a position which is extended from said shaft means by a predetermined distance;

drive means for slidably shifting said objective lens support member along said shaft means, and for rotating said objective lens support member around said shaft means;

a symmetrical, elastic damping member secured to said shaft means at its center portion thereof; and securing means tightly connecting opposing ends of said symmetrical, elastic damping member to said objective lens support member.

2. The objective lens drive/support mechanism of claim 1, said drive means comprising:

a circular shaped coil disposed below said objective lens support member, said circular shaped coil performing the focus control;

a pair of rectangular coils disposed within said circular shaped coil, said pair of rectangular coils performing the tracking control; and yoke means associated with said circular shaped coil and said pair of rectangular coils, said yoke means including a bottom base to which said shaft means is secured.

3. An objective lens drive/support mechanism comprising:

shaft means;

an objective lens support member slidably and rotatably secured to said shaft means;

an objective lens disposed in said objective lens support member at a position which is extended from said shaft means by a predetermined distance;

drive means for slidably shifting said objective lens support member along said shaft means, and for rotating said objective lens support member around said shaft means;

a symmetrical, elastic damping member secured to said shaft means at its center portion thereof, said symmetrical elastic damping member comprising:

a substantially FIG. 8 shaped elastic plate, which includes:

a center portion;

a pair of crotches symmetrically extending from said center portion;

a metal coupler secured to said center portion of said symmetrical elastic damping member, said metal coupler being connected to said shaft means; and a pair of metal legs as securing means being secured to opposing ends of said pair of crotches, said pair of metal legs being operatively connected to said objective lens support member;

said securing means tightly connecting opposing ends of said symmetrical, elastic damping member to said objective lens support member.

4. The objective lens drive/support mechanism of claim 3 wherein the elastic plate is made of rubber.

5. A symmetrical elastic damping member which comprises:

shaft means;

a center portion;

a pair of crotches symmetrically extending from said center portion;

a metal coupler secured to said center portion of said symmetrical elastic damping member, said metal coupler being connected to said shaft means; and a pair of metal legs as securing means being secured to opposing end said pair of crotches, said pair of metal legs being operatively connected to an objective lens support member;

said securing means tightly connecting opposing ends of said symmetrical elastic damping member to said objective lens support member.

* * * * *